UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

TOILET-SOAP.

SPECIFICATION forming part of Letters Patent No. 273,239, dated February 27, 1883.

Application filed February 25, 1882. (No specimens.)

*To all whom it may concern:*

Be it known that I, JAMES J. JOHNSTON, of Columbiana, in the county of Columbiana and State of Ohio, have invented a certain new and useful Improvement in Toilet-Soap; and I do hereby declare that the following is a full, clear, and exact description thereof.

My invention relates to an improvement in toilet-soap; and it consists in making said soap of tallow, petroleum-oil, rosin, lime, soda-ash, and a decoction of sassafras, borax, citronella-oil, and lavender-oil, said ingredients being used in quantities and proportions and treated in the manner hereinafter described.

To enable others skilled in the art with which my invention is most nearly connected to make and use it, I will proceed to describe its construction and operation.

I take about ten (10) pounds of pure tallow, and about ten (10) pounds of petroleum-oil distilled in the manner described in Letters Patent No. 31,982, granted to me April 9, 1861, said oil being of specific gravity of about 35°, and about forty (40) pounds of rosin. I melt the tallow and rosin (in an apparatus described in an application of even date with this, and designated "Division A") at a temperature not over two hundred degrees (200°) Fahrenheit; then gradually add the ten (10) pounds of petroleum-oil; then take about eight (8) pounds of lime and sixteen (16) pounds of soda-ash, and triturate the lime and soda-ash until they become mechanically a homogeneous mass, which is dissolved in about forty (40) pounds of strong decoction of sassafras made from the bark of the root, said decoction being at a temperature of about one hundred and fifty degrees (150°) Fahrenheit, adding gradually and slowly the mass of lime and soda-ash combined, stirring the decoction while so doing, and after sufficient time has been allowed for the undissolved particles of lime and soda-ash to precipitate the solution is carefully "racked off" from the precipitated matter, the melted tallow, rosin, and the oil in the caldron of said apparatus are thoroughly agitated, and during the agitation the solution described is gradually added, after which the whole mass is kept in an agitated state at a temperature of about two hundred degrees (200°) Fahrenheit for about two hours. It is then allowed to gradually cool (still keeping up the agitation) until it has fallen to a temperature of about one hundred and twenty degrees (120°) Fahrenheit, at which point I then gradually add twelve (12) pounds of borax, having been thoroughly triturated with one-fourth ($\frac{1}{4}$) of a pound of the oil of citronella and one-fourth ($\frac{1}{4}$) of a pound of the oil of lavender, keeping up a thorough agitation of the whole mass while adding the borax thus prepared, until the temperature has fallen to about one hundred degrees (100°) Fahrenheit, at which point it is then dipped out into molds, and when congealed is subsequently cut into bars or cakes, as may be desired.

The soap hereinbefore described will be an excellent article for toilet purposes, in that it will promote a healthy, vivifying, and cleansing effect of the skin, without the least irritation of the same, and at the same time imparting a fresh and beautifying appearance to it.

I am aware that it is common to use petroleum-oil in the manufacture of soap, and therefore do not claim, broadly, the use of petroleum-oil; but in contradistinction to the ordinary distilled petroleum-oil I use said oil mixed with wood-charcoal in the still, and subsequently distill the oil at a low degree of heat, as described in the before-mentioned patent.

Having thus described my invention, what I claim as new, and desire to secure by Letters Patent, is—

A toilet-soap made of tallow, petroleum-oil distilled as hereinbefore described, rosin, lime, soda-ash, a decoction of sassafras, borax, citronella-oil, and lavender-oil in about the quantities and proportions, and treated in the manner hereinbefore specified, and for the purpose set forth.

JAMES J. JOHNSTON.

Witnesses:
T. D. D. OURAND,
D. P. COWL.